United States Patent
Hoffer et al.

(10) Patent No.: US 11,096,444 B2
(45) Date of Patent: Aug. 24, 2021

(54) PARTICULATE FOAM WITH PARTIAL RESTRICTION

(71) Applicant: NIKE, Inc., Beaverton, OR (US)

(72) Inventors: Kevin W. Hoffer, Portland, OR (US);
Cassidy R. Levy, West Linn, OR (US);
Nicholas R. Long, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 322 days.

(21) Appl. No.: 16/327,692

(22) PCT Filed: Sep. 23, 2016

(86) PCT No.: PCT/US2016/053232
§ 371 (c)(1),
(2) Date: Feb. 22, 2019

(87) PCT Pub. No.: WO2017/053650
PCT Pub. Date: Mar. 30, 2017

(65) Prior Publication Data
US 2019/0216168 A1     Jul. 18, 2019

Related U.S. Application Data

(60) Provisional application No. 62/222,842, filed on Sep. 24, 2015, provisional application No. 62/222,816, (Continued)

(51) Int. Cl.
*A43B 13/12*     (2006.01)
*A43B 13/18*     (2006.01)
(Continued)

(52) U.S. Cl.
CPC .......... *A43B 13/141* (2013.01); *A43B 1/0072* (2013.01); *A43B 5/00* (2013.01);
(Continued)

(58) Field of Classification Search
CPC ... A43B 13/125; A43B 13/127; A43B 13/181; A43B 13/187; A43B 13/188
(Continued)

(56) References Cited

U.S. PATENT DOCUMENTS 2,930,149 A    3/1960  Hack
3,087,262 A    4/1963  Russell
(Continued)

FOREIGN PATENT DOCUMENTS

CH      283034 A    5/1952
CN     1053884 A    8/1991
(Continued)

OTHER PUBLICATIONS

Korean Intellectual Property Office, Office Action for KR Application No. 10-2019-7036063, dated Feb. 7, 2020.
(Continued)

*Primary Examiner* — Sharon M Prange
(74) *Attorney, Agent, or Firm* — Honigman LLP; Matthew H. Szalach; Jonathan O'Brien

(57) ABSTRACT

An article of footwear includes an upper, an outsole attached to the upper, and a midsole disposed between the upper and the outsole. The outsole includes a ground-engaging surface, an inner surface formed on an opposite side of the outsole than the ground-engaging surface, and a wall surrounding a perimeter of the outsole. The wall cooperates with the inner surface to define a cavity. The midsole includes a footbed and a bottom surface disposed on an opposite side of the midsole than the footbed and opposing the inner surface of the outsole. The article of footwear also includes fibers received within the cavity. The fibers cooperate with one another to form a mesh that at least partially fills the cavity.

(Continued)

The article of footwear also includes particulate matter disposed within the cavity and received within interstitial spaces of the mesh.

17 Claims, 7 Drawing Sheets

Related U.S. Application Data filed on Sep. 24, 2015, provisional application No. 62/222,873, filed on Sep. 24, 2015, provisional application No. 62/222,851, filed on Sep. 24, 2015, provisional application No. 62/222,832, filed on Sep. 24, 2015, provisional application No. 62/222,882, filed on Sep. 24, 2015.

(51) Int. Cl.
```
A43B 13/14      (2006.01)
A43B 13/20      (2006.01)
A43B 1/00       (2006.01)
A43B 13/04      (2006.01)
A43B 5/00       (2006.01)
A43B 13/16      (2006.01)
B32B 5/16       (2006.01)
B32B 5/18       (2006.01)
B32B 25/04      (2006.01)
B32B 25/14      (2006.01)
A43B 7/14       (2006.01)
A43B 7/32       (2006.01)
```

(52) U.S. Cl.
CPC ............... *A43B 7/141* (2013.01); *A43B 7/32* (2013.01); *A43B 13/04* (2013.01); *A43B 13/122* (2013.01); *A43B 13/125* (2013.01); *A43B 13/127* (2013.01); *A43B 13/16* (2013.01); *A43B 13/181* (2013.01); *A43B 13/186* (2013.01); *A43B 13/187* (2013.01); *A43B 13/188* (2013.01); *A43B 13/189* (2013.01); *A43B 13/20* (2013.01); *A43B 13/206* (2013.01); *B32B 5/16* (2013.01); *B32B 5/18* (2013.01); *B32B 25/047* (2013.01); *B32B 25/14* (2013.01); *B32B 2264/02* (2013.01); *B32B 2437/02* (2013.01)

(58) Field of Classification Search
USPC ........................................................ 36/30 A
See application file for complete search history.

(56) References Cited

U.S. PATENT DOCUMENTS

| | | | |
|---|---|---|---|
| 3,469,576 A | 9/1969 | Smith et al. | |
| 3,552,044 A | 1/1971 | Wiele | |
| 3,608,215 A | 9/1971 | Fukuoka | |
| 3,765,422 A | 10/1973 | Smith | |
| 3,906,570 A | 9/1975 | Revill | |
| 3,971,839 A | 7/1976 | Taylor | |
| 4,170,078 A | 10/1979 | Moss | |
| 4,307,200 A | 12/1981 | Lichter et al. | |
| 4,343,047 A | 8/1982 | Lazowski et al. | |
| 4,345,387 A | 8/1982 | Daswick | |
| 4,524,529 A * | 6/1985 | Schaefer | A43B 13/38 |
| | | | 36/98 |
| 4,658,515 A * | 4/1987 | Oatman | A43B 17/14 |
| | | | 36/2.6 |
| 4,686,781 A | 8/1987 | Bury | |
| 4,724,627 A | 2/1988 | Sisco | |
| 4,823,799 A | 4/1989 | Robbins | |
| 4,905,320 A | 3/1990 | Squyers, Jr. | |
| 4,970,807 A | 11/1990 | Anderie et al. | |
| 5,005,575 A | 4/1991 | Geri | |
| 5,150,490 A | 9/1992 | Busch et al. | |
| 5,231,776 A | 8/1993 | Wagner | |
| 5,363,570 A | 11/1994 | Allen et al. | |
| 5,378,223 A | 1/1995 | Grim et al. | |
| 5,383,290 A | 1/1995 | Grim | |
| 5,392,534 A | 2/1995 | Grim | |
| 5,517,770 A | 5/1996 | Martin et al. | |
| 5,617,650 A | 4/1997 | Grim | |
| 5,632,057 A * | 5/1997 | Lyden | A43B 3/0063 |
| | | | 12/146 B |
| 5,665,285 A | 9/1997 | Hattori et al. | |
| 5,718,064 A | 2/1998 | Pyle | |
| 5,753,357 A | 5/1998 | Filipitsch et al. | |
| 5,758,435 A | 6/1998 | Miyata | |
| 5,920,915 A | 7/1999 | Bainbridge et al. | |
| 5,987,781 A | 11/1999 | Pavesi et al. | |
| 6,020,055 A | 2/2000 | Pearce | |
| 6,032,300 A | 3/2000 | Bainbridge et al. | |
| 6,061,928 A | 5/2000 | Nichols | |
| 6,098,209 A | 8/2000 | Bainbridge et al. | |
| 6,158,149 A | 12/2000 | Rudy | |
| 6,266,896 B1 | 7/2001 | Liu | |
| D460,852 S | 7/2002 | Daudier | |
| 6,453,477 B1 * | 9/2002 | Bainbridge | A41D 13/015 |
| | | | 2/455 |
| 6,502,331 B2 | 1/2003 | Hines | |
| 6,532,689 B1 | 3/2003 | Jones, Jr. | |
| 6,635,203 B2 | 10/2003 | Monaci | |
| 6,759,443 B2 | 7/2004 | Brant et al. | |
| 6,782,640 B2 | 8/2004 | Westin | |
| 6,848,200 B1 | 2/2005 | Westin | |
| 6,878,753 B1 | 4/2005 | Takemura et al. | |
| 7,037,571 B2 | 5/2006 | Fish et al. | |
| 7,069,672 B2 | 7/2006 | Hahn | |
| 7,152,342 B2 | 12/2006 | Sommer | |
| 7,484,318 B2 | 2/2009 | Finkelstein | |
| 7,555,851 B2 | 7/2009 | Hazenberg et al. | |
| 7,594,344 B2 | 9/2009 | Mizrahi | |
| 7,805,859 B2 | 10/2010 | Finkelstein | |
| 7,823,238 B2 | 11/2010 | Din Mahamed | |
| 7,904,971 B2 | 3/2011 | Doria et al. | |
| 8,091,254 B2 | 1/2012 | Wang | |
| 8,178,022 B2 | 5/2012 | Schindler et al. | |
| 8,272,149 B2 | 9/2012 | Cooper et al. | |
| 8,671,591 B2 | 3/2014 | Brown | |
| 8,713,817 B2 | 5/2014 | Litchfield et al. | |
| 9,078,493 B2 * | 7/2015 | Bradford | A43B 13/145 |
| 2001/0000835 A1 | 5/2001 | Hines | |
| 2003/0046831 A1 | 3/2003 | Westin | |
| 2005/0022424 A1 | 2/2005 | Held | |
| 2005/0086728 A1 | 4/2005 | Tobergte | |
| 2005/0150132 A1 | 7/2005 | Iannacone | |
| 2006/0010717 A1 | 1/2006 | Finkelstein | |
| 2006/0026863 A1 | 2/2006 | Liu | |
| 2006/0130363 A1 | 6/2006 | Hottinger | |
| 2007/0051018 A1 | 3/2007 | Issler | |
| 2007/0169379 A1 | 7/2007 | Hazenberg et al. | |
| 2008/0060221 A1 * | 3/2008 | Hottinger | A43B 13/187 |
| | | | 36/28 |
| 2008/0066341 A1 | 3/2008 | Hottinger | |
| 2008/0148599 A1 | 6/2008 | Collins | |
| 2008/0230956 A1 | 9/2008 | Allmendinger et al. | |
| 2009/0094855 A1 | 4/2009 | Finkelstein | |
| 2009/0313853 A1 * | 12/2009 | Tadin | B32B 5/26 |
| | | | 36/91 |
| 2010/0011618 A1 | 1/2010 | Bitton | |
| 2010/0047550 A1 | 2/2010 | Prissok et al. | |
| 2010/0154252 A1 | 6/2010 | Avent et al. | |
| 2010/0222442 A1 | 9/2010 | Prissok et al. | |
| 2010/0251565 A1 | 10/2010 | Litchfield et al. | |
| 2011/0016747 A1 | 1/2011 | Bitton | |
| 2011/0081506 A1 * | 4/2011 | Lee | C08L 23/12 |
| | | | 428/17 |
| 2011/0215497 A1 | 9/2011 | McEvoy et al. | |
| 2012/0036698 A1 | 2/2012 | Guertin | |
| 2012/0073163 A1 | 3/2012 | Tse | |
| 2012/0204451 A1 | 8/2012 | De Roode et al. | |

(56) References Cited

U.S. PATENT DOCUMENTS

| | | |
|---|---|---|
| 2012/0210602 A1 | 8/2012 | Brown |
| 2013/0008050 A1 | 1/2013 | Marc |
| 2013/0145653 A1 | 6/2013 | Bradford |
| 2013/0247422 A1 | 9/2013 | Holt et al. |
| 2014/0007456 A1 | 1/2014 | Tadin |
| 2014/0151918 A1 | 6/2014 | Hartmann |
| 2014/0223776 A1 | 8/2014 | Wardlaw et al. |
| 2014/0223777 A1 | 8/2014 | Whiteman et al. |
| 2014/0283413 A1 | 9/2014 | Christensen et al. |
| 2015/0196085 A1* | 7/2015 | Westmoreland ..... A43B 13/026 36/87 |
| 2015/0223564 A1 | 8/2015 | Peyton et al. |
| 2015/0257481 A1 | 9/2015 | Campos, II et al. |
| 2016/0073732 A1 | 3/2016 | Ernst et al. |
| 2016/0168774 A1* | 6/2016 | Breithaupt ............... D04H 1/76 36/50.1 |
| 2017/0055636 A1 | 3/2017 | Campos, II et al. |
| 2018/0132564 A1 | 5/2018 | Bruce et al. |
| 2019/0343225 A1 | 11/2019 | Reddy et al. |

FOREIGN PATENT DOCUMENTS

| | | |
|---|---|---|
| CN | 1211901 A | 3/1999 |
| CN | 2620493 Y | 6/2004 |
| CN | 1638663 A | 7/2005 |
| CN | 2888936 Y | 4/2007 |
| CN | 202051034 U | 11/2011 |
| CN | 202145956 U | 2/2012 |
| CN | 103141993 A | 6/2013 |
| CN | 103720129 A | 4/2014 |
| CN | 104010541 A | 8/2014 |
| CN | 104203029 A | 12/2014 |
| CN | 104363783 A | 2/2015 |
| CN | 104490008 A | 4/2015 |
| DE | 2907506 A1 | 9/1980 |
| DE | 3406504 A1 | 8/1985 |
| DE | 3627538 A1 | 2/1988 |
| DE | 3723549 A1 | 2/1988 |
| DE | 3406504 C2 | 1/1990 |
| DE | 3839747 A1 | 5/1990 |
| DE | 3905989 C2 | 1/1991 |
| DE | 4202159 A1 | 7/1993 |
| DE | 4401282 A1 | 12/1994 |
| DE | 444625 A1 | 6/1995 |
| DE | 19708622 A1 | 9/1997 |
| DE | 19938609 A1 | 3/2001 |
| DE | 10138426 C1 | 12/2002 |
| DE | 102009009589 A1 | 9/2010 |
| DE | 102010046278 A1 | 2/2011 |
| DE | 202016014626 U1 | 10/2016 |
| EP | 0007948 A1 | 2/1980 |
| EP | 130816 A2 | 1/1985 |
| EP | 316289 A2 | 5/1989 |
| EP | 0359699 A1 | 3/1990 |
| EP | 0383685 A1 | 8/1990 |
| EP | 529941 A1 | 3/1993 |
| EP | 2609824 A1 | 7/2013 |
| EP | 2649896 B1 | 10/2016 |
| EP | 3386334 A1 | 10/2018 |
| FR | 996111 A | 12/1951 |
| FR | 1018215 A | 12/1952 |
| FR | 2824884 A1 | 11/2002 |
| GB | 1301147 A | 12/1972 |
| GB | 1433481 A * | 4/1976 ............. B32B 5/022 |
| GB | 2066049 A | 7/1981 |
| GB | 2462100 A | 1/2010 |
| JP | S56-080702 U | 6/1981 |
| JP | H02-121601 A | 5/1990 |
| JP | H05-37104 U | 5/1993 |
| JP | H0723804 A | 1/1995 |
| JP | H0739404 A | 2/1995 |
| JP | 3042853 U | 11/1997 |
| JP | H11-32806 A | 2/1999 |
| JP | 2000316606 A | 11/2000 |
| JP | 2002306280 A | 10/2002 |
| JP | 2009056007 A | 3/2009 |
| JP | 2014033742 A | 2/2014 |
| JP | 2015513354 A | 5/2015 |
| KR | 19990069793 A | 9/1999 |
| KR | 100230096 B1 | 11/1999 |
| KR | 200374026 Y1 | 1/2005 |
| KR | 20100086227 A | 7/2010 |
| KR | 20120033710 A | 4/2012 |
| TW | 385636 U | 3/2000 |
| WO | WO-1997035496 A1 | 10/1997 |
| WO | WO-9947014 A1 | 9/1999 |
| WO | WO-2006049401 A1 | 5/2006 |
| WO | WO-2008012809 A2 | 1/2008 |
| WO | WO-2012177957 A2 | 12/2012 |
| WO | WO-2013013784 A1 | 1/2013 |
| WO | WO-2014126799 A1 | 8/2014 |
| WO | WO-2015/065578 A1 | 5/2015 |
| WO | WO-2018169535 A1 | 9/2018 |
| WO | WO-2018175734 A1 | 9/2018 |
| WO | WO-2020125963 A1 | 6/2020 |

OTHER PUBLICATIONS

China National Intellectual Property Office, Office Action for CN Application No. 201680066156.7, dated Jan. 22, 2020.
China National Intellectual Property Office, Office Action and Search Report for CN Application No. 201680062323.0, dated Mar. 4, 2020.
China National Intellectual Property Office, Office Action and Search Report for CN Application No. 201680062231.2, dated Mar. 24, 2020.
China National Intellectual Property Office, Office Action for CN Application No. 201680066534.1, dated Mar. 26, 2020.
China National Intellectual Property Office, Office Action and Search Report for CN Application No. 201680062300.X, dated Mar. 12, 2020.
European Patent Office, Communication pursuant to Article 94(3) EPC for EP Application No. 16777864.6, dated Apr. 7, 2020.
Korean Intellectual Property Office, Office Action for KR Application No. 10-2018-7011479, dated Dec. 26, 2019.
Korean Intellectual Property Office, Office Action for KR Application No. 10-2018-7011480, dated Jan. 21, 2020.
European Patent Office, Communication pursuant to Article 94(3) EPC for EP Application No. 16777865.3, dated Apr. 20, 2020.
Korean Intellectual Property Office, Office Action for KR Application No. 10-2020-7003423, dated Apr. 21, 2020.
European Patent Office, Extended European Search Report for EP Application No. 19196682.9, dated Jan. 2, 2020.
China National Intellectual Property Office, Office Action for CN Application No. 201680062271.7, dated Feb. 3, 2020.
European Patent Office, Communication pursuant to Article 94(3) EPC for EP Application No. 16777863.8, dated Apr. 15, 2020.
Japan Patent Office, Decision of Rejection for JP Application No. 2018-515812, dated Apr. 6, 2020.
European Patent Office, Extended European Search Report for EP Application No. 19212921.1, dated Mar. 31, 2020.
Japan Patent Office, Notice of Reasons for Rejection for JP Application No. 2018-515812 dated Jul. 29, 2019.
Japan Patent Office, Notice of Reasons for Rejection for JP Application No. 2018-515822 dated Jul. 22, 2019.
Japan Patent Office, Notice of Reasons for Rejection for JP Application No. 2018-515842 dated Aug. 5, 2019.
Japan Patent Office, Notice of Reasons for Rejection for JP Application No. 2018-515825 dated Jul. 22, 2019.
Japan Patent Office, Notice of Reasons for Rejection for JP Application No. 2018-515843 dated Aug. 5, 2019.
Japan Patent Office, Notice of Reasons for Rejection for JP Application No. 2018-515828 dated Jul. 22, 2019.
Taiwan Intellectual Property Office, Search Report for TW Application No. 105130844 dated Aug. 27, 2019.
European Patent Office (ISA), International Search Report and Written Opinion for PCT Application No. PCT/US2017/022651, dated Oct. 25, 2017.

(56) References Cited

OTHER PUBLICATIONS

European Patent Office (ISA), International Search Report and Written Opinion for PCT Application No. PCT/US2017/022647, dated Nov. 2, 2017.
European Patent Office (ISA), International Preliminary Report on Patentability for International Application No. PCT/US2017/022651, dated Sep. 26, 2019.
European Patent Office (ISA), International Preliminary Report on Patentability for International Application No. PCT/US2017/022647, dated Sep. 26, 2019.
United States Patent and Trademark Office, Office Action for U.S. Appl. No. 15/574,700, dated Oct. 22, 2019.
Korean Intellectual Property Office, Office Action for Application No. 10-2018- 7011476, dated May 29, 2019.
Korean Intellectual Property Office, Office Action for Application No. 10-2018-7011477, dated May 29, 2019.
Korean Intellectual Property Office, Office Action for Application No. 10-2018-7011479, dated Jun. 4, 2019.
Korean Intellectual Property Office, Office Action for Application No. 10-2018-7011480, dated Jun. 10, 2019.
Korean Intellectual Property Office, Office Action for Application No. 10-2018-7011478, dated Jun. 4, 2019.
European Patent Office as the International Searching Authority, International Search Report and Written Opinion for PCT Application No. PCT/US2016/053256, dated Jan. 12, 2017.
European Patent Office as the International Searching Authority, International Search Report and Written Opinion for PCT Application No. PCT/US2016/053240, dated Jan. 3, 2017.
European Patent Office as the International Searching Authority, International Search Report and Written Opinion for PCT Application No. PCT/US2016/053260, dated Dec. 15, 2016.
European Patent Office as the International Searching Authority, International Search Report and Written Opinion for PCT Application No. PCT/US2016/053232, dated Jan. 10, 2017.
European Patent Office as the International Searching Authority, International Search Report and Written Opinion for PCT Application No. PCT/US2016/053246, dated Jan. 10, 2017.
European Patent Office as the International Searching Authority, International Search Report and Written Opinion for PCT Application No. PCT/US2016/053265, dated Dec. 20, 2016.
United States Patent and Trademark Office, Office Action for U.S. Appl. No. 15/816,270, dated Apr. 17, 2018.
United States Patent and Trademark Office, Office Action for U.S. Appl. No. 15/816,200, dated Apr. 18, 2018.
European Patent Office (ISA), International Search Report and Written Opinion for PCT Application No. PCT/US2020/042784, dated Sep. 17, 2020.
Ge, Chengbiao et al., Steam-chest molding of expanded thermoplastic polyuerethane bead foams and their mechanical properties, Chemical Engineering Science 174 (2017) pp. 337-346.
Japan Patent Office, Notification of Reasons for Refusal for JP Application No. 2019-550843, dated Nov. 24, 2020.
European Patent Office, Communication pursuant to Article 94(3) EPC for EP Application No. 16777864.6, dated Dec. 16, 2020.
European Patent Office, Communication pursuant to Article 94(3) EPC for EP Application No. 16777863.8, dated Dec. 22, 2020.
KS65 Luxury Light Fescue—Field Green <http://www.kodiaksports.com/Artificial-Turf/Fake-Grass/Artificial-Grass-ST65_LFS_Field, Oct. 12, 2013, (Oct. 12, 2013), Retrieved from internet: URL: https://web.archive.org/web/*/http://www.kodiaksports.com/core/media/media.nl/id.28351/c.1268496/.f?h=1c04c87e9fd3f9d67f24 [retrieved on Dec. 15, 2016].
European Patent Office as the International Searching Authority, International Search Report and Written Opinion for PCT Application No. PCT/US2020/042735, dated Sep. 16, 2020.
European Patent Office as the International Searching Authority, International Search Report and Written Opinion for PCT Application No. PCT/US2020/042784, dated Sep. 17, 2020.
European Patent Office as the International Searching Authority, International Search Report and Written Opinion for PCT Application No. PCT/US2020/042807, dated Sep. 16, 2020.
Taiwan Office Action for Application 109111247 dated Apr. 30, 2021.
Japan Patent Office, Notice of Reasons for Rejection for JP Application No. 2020-017002 dated May 31, 2021.

\* cited by examiner

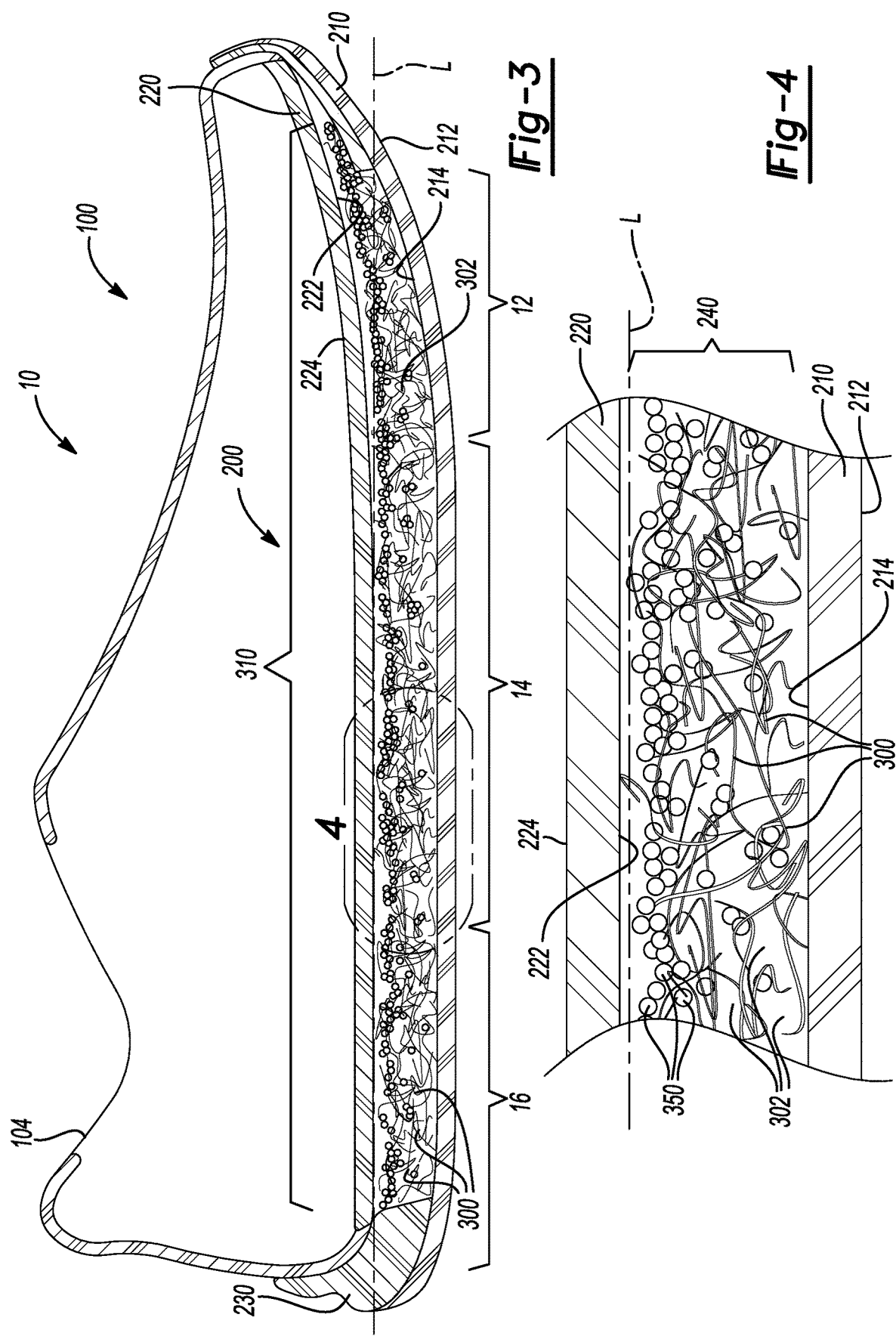

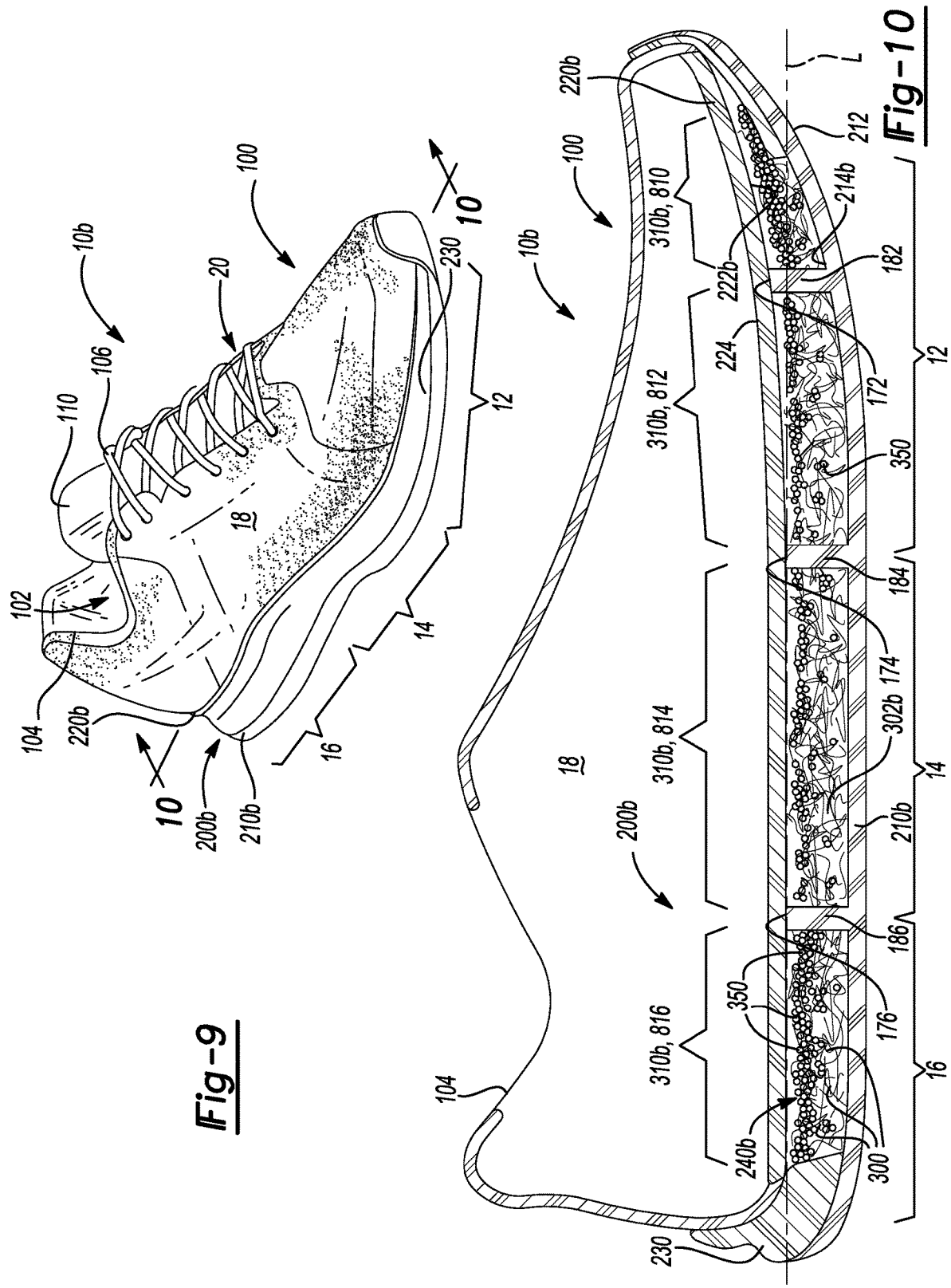

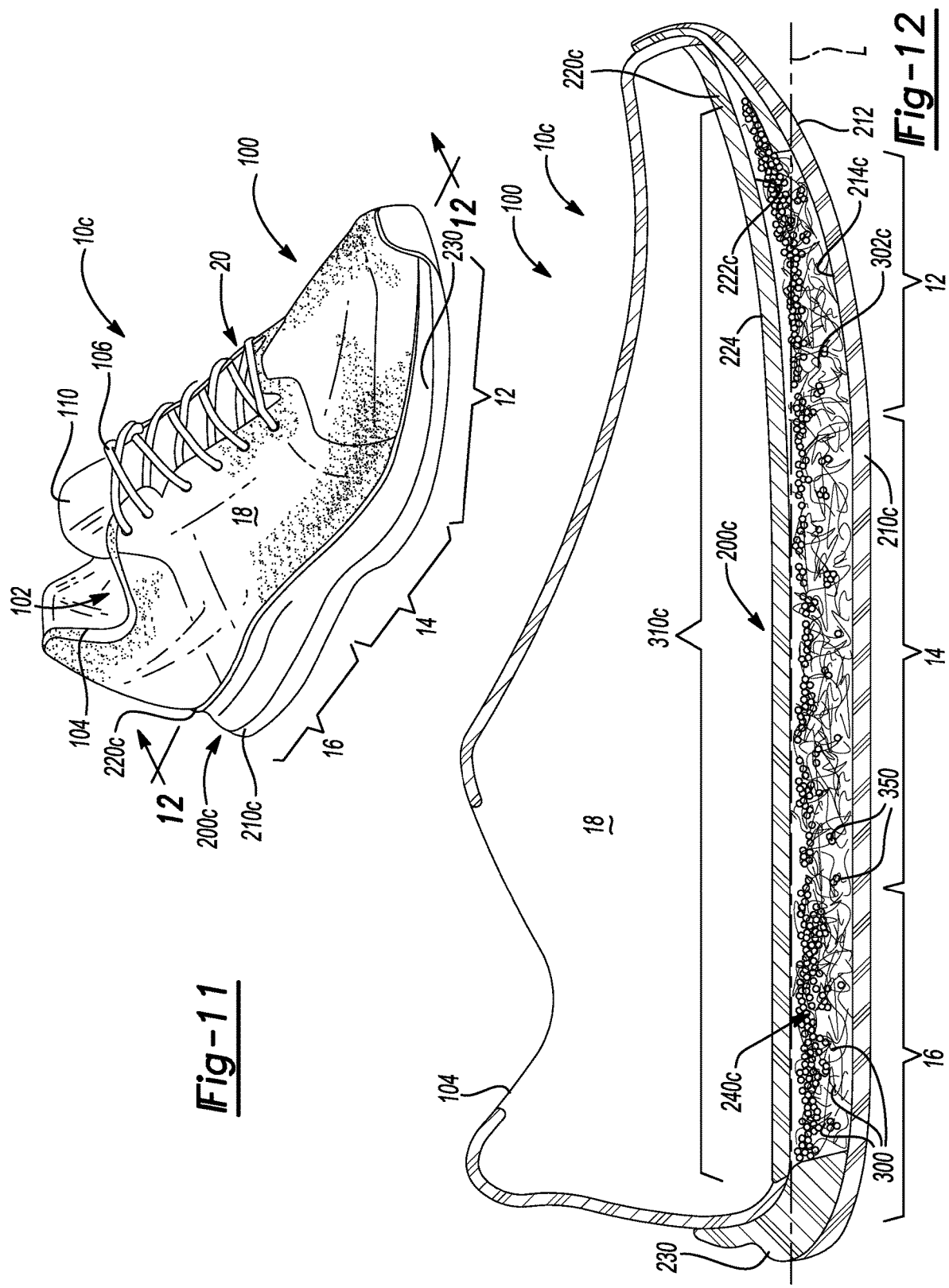

PARTICULATE FOAM WITH PARTIAL RESTRICTION

CROSS REFERENCE TO RELATED APPLICATIONS

This application is a 371 National Stage entry based on International Application No. PCT/US2016/053232, filed Sep. 23, 2016, which claims priority to U.S. Provisional Application Ser. No. 62/222,882, filed Sep. 24, 2015, and to U.S. Provisional Application Ser. No. 62/222,873, filed Sep. 24, 2015, and to U.S. Provisional Application Ser. No. 62/222,851, filed Sep. 24, 2015, and to U.S. Provisional Application Ser. No. 62/222,842, filed Sep. 24, 2015, and to U.S. Provisional Application Ser. No. 62/222,832, filed Sep. 24, 2015, and to U.S. Provisional Application Ser. No. 62/222,816, filed Sep. 24, 2015, the disclosures of which are hereby incorporated by reference in their entirety.

FIELD

The present disclosure relates to articles of footwear having particulate foam incorporated with elements that restrict migration of the particulate foam within the article of footwear.

BACKGROUND

This section provides background information related to the present disclosure which is not necessarily prior art.

Articles of footwear conventionally include an upper and a sole structure. The upper may be formed from any suitable material(s) to receive, secure and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhancing traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side which may be contoured to conform to a profile of the bottom surface of the foot. Sole structures may also include a comfort-enhancing insole or a sockliner located within a void proximate to the bottom portion of the upper.

Midsoles using polymer foam materials are generally configured as a single slab that compresses resiliently under applied loads, such as during walking or running movements. Generally, single-slab polymer foams are designed with an emphasis on balancing cushioning characteristics that relate to softness and responsiveness as the slab compresses under gradient loads. Polymer foams providing cushioning that is too soft will decrease the compressibility and the ability of the midsole to attenuate ground-reaction forces after repeated compressions. Conversely, polymer foams that are too hard and, thus, very responsive, sacrifice softness, thereby resulting in a loss in comfort. While different regions of a slab of polymer foam may vary in density, hardness, energy return, and material selection to balance the softness and responsiveness of the slab as a whole, creating a single slab of polymer foam that loads in a gradient manner from soft to responsive is difficult to achieve.

DRAWINGS

The drawings described herein are for illustrative purposes only of selected configurations and are not intended to limit the scope of the present disclosure.

FIG. 3 is a cross-sectional view taken along line 3-3 of FIG. 1 showing fibers received within a cavity between an inner surface of an outsole and a bottom surface of a midsole and particulate matter disposed within the cavity and received within interstitial spaces of mesh formed by the fibers;

FIG. 4 is a detailed cross-sectional view taken along dashed box 4 of FIG. 3 showing fibers received within a cavity between an inner surface of an outsole and a bottom surface of a midsole and particulate matter disposed within the cavity and received within interstitial spaces of mesh formed by the fibers;

FIG. 9 is a top perspective view of an article of footwear in accordance with principles of the present disclosure;

FIG. 10 is a cross-sectional view taken along line 10-10 of FIG. 9 showing walls extending from an inner surface of an outsole and terminating at a point of contact with a bottom surface of a midsole to divide a mesh that defines interstitial spaces for receiving particulate matter into two or more regions;

FIG. 11 is a top perspective view of an article of footwear in accordance with principles of the present disclosure; and FIG. 12 is a cross-sectional view taken along line 12-12 of FIG. 11 showing a mesh residing within a cavity between an outsole and a midsole and particulate matter at least partially filling interstitial spaces defined by the mesh.

Corresponding reference numerals indicate corresponding parts throughout the drawings.

DETAILED DESCRIPTION

Figure 1:
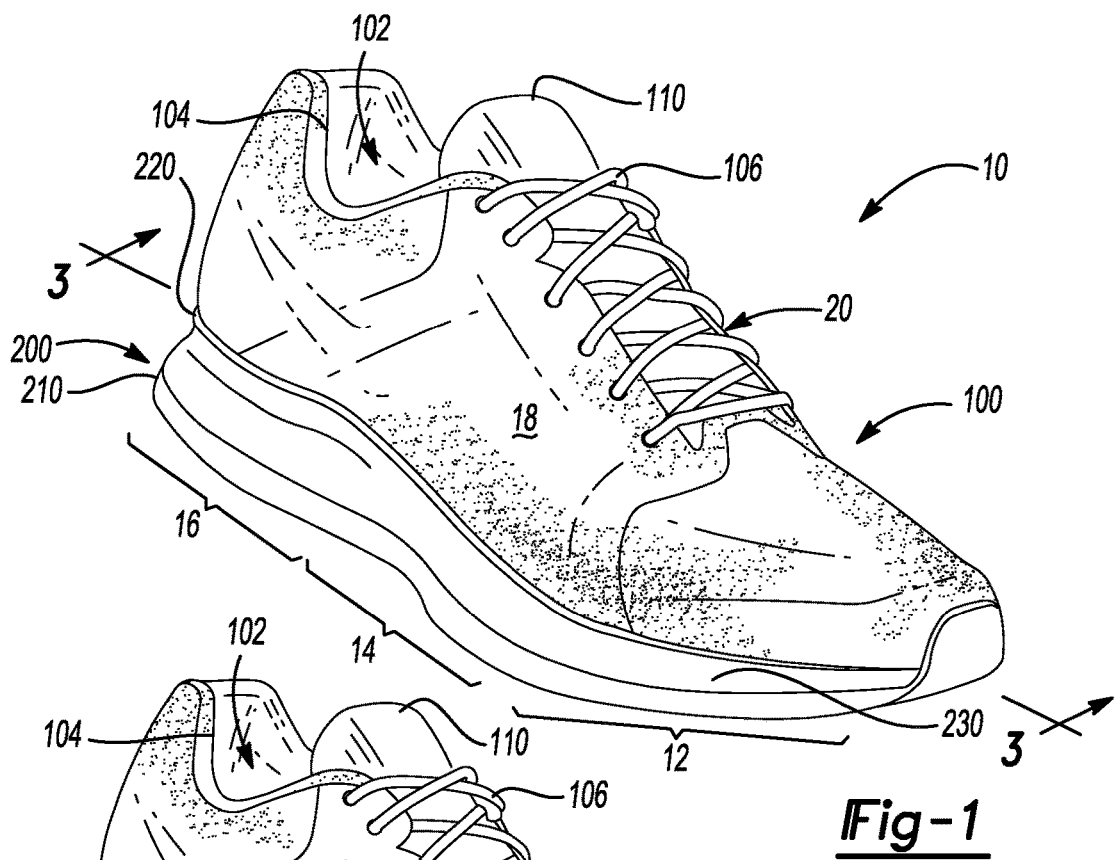
FIG. 1 is a top perspective view of an article of footwear in accordance with principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure includes an article of footwear having an upper and an outsole attached to the upper. The outsole includes a ground-engaging surface, an inner surface, and a wall surrounding a perimeter of the outsole. The inner surface is formed on an opposite side of the outsole than the ground-engaging surface. The wall cooperates with the inner surface to define a cavity. The article of footwear further includes a midsole disposed between the upper and the outsole. The midsole includes a footbed and a bottom surface disposed on an opposite side of the midsole than the footbed that opposes the inner surface of the outsole. The article of footwear also includes fibers received within the cavity that cooperate with one another to form a mesh that at least partially fills the cavity. Particulate matter is disposed within the cavity and is received within interstitial spaces of the mesh.

In some implementations, the particulate matter is permitted to move relative to the fibers while the fibers restrict unfettered movement of the particulate matter within the mesh. The fibers may be attached to one another. Additionally or alternatively, the fibers are moveable relative to one another. In some examples, the mesh is fixed for movement with the outsole. The mesh may include a different density along a length of the midsole.

In some examples, the particulate matter disposed within the cavity includes foam beads including approximately the same size and shape or at least one of a different size and shape. In these examples, the foam beads may include a substantially spherical shape.

In some implementations, the midsole includes a heel region, a forefoot region, and a mid-foot region disposed between the heel region and the forefoot region. In some examples, the mesh has a different density in at least one of the heel region, the forefoot region, and the mid-foot region. For instance, the mesh may have a different density in each of the heel region, the forefoot region, and the mid-foot region. In other examples, the mesh has a substantially constant density in each of the heel region, the forefoot region, and the mid-foot region.

The article of footwear may also include walls separating the heel region, the forefoot region, and the mid-foot region. In some scenarios, the walls extend substantially perpendicular to a longitudinal axis of the midsole. For instance, the walls may extend from the inner surface of the outsole toward the midsole. In some implementations, the walls are spaced apart from the bottom surface of the midsole. Alternatively, at least one of the walls may be in contact with the bottom surface of the midsole. Optionally, each of the walls may be in contact with the bottom surface of the midsole. The walls may prevent or restrict movement of the particulate matter between the heel region, the forefoot region, and the mid-foot region.

Another aspect of the disclosure includes an article of footwear having an upper and an outsole attached to the upper. The upper includes a ground-engaging surface and a footbed is disposed between the upper and the outsole. The article of footwear also includes fibers disposed between the outsole and the footbed. The fibers cooperate with one another to form a mesh that at least partially fills a cavity between the outsole and the footbed. The article of footwear also includes particulate matter disposed within the cavity and received within interstitial spaces of the mesh.

In some implementations, the particulate matter is permitted to move relative to the fibers while the fibers restrict unfettered movement of the particulate matter within the mesh. The fibers may be attached to one another. Additionally or alternatively, the fibers are moveable relative to one another. In some examples, the mesh is fixed for movement with the outsole. The mesh may include a different density along a length of the outsole.

In some examples, the particulate matter disposed within the cavity includes foam beads including approximately the same size and shape or at least one of a different size and shape. In these examples, the foam beads may include a substantially spherical shape.

Optionally, the outsole includes a heel region, a forefoot region, and a mid-foot region disposed between the heel region and the forefoot region. In some examples, the mesh has a different density in at least one of the heel region, the forefoot region, and the mid-foot region. For instance, the mesh may have a different density in each of the heel region, the forefoot region, and the mid-foot region. In other examples, the mesh has a substantially constant density in each of the heel region, the forefoot region, and the mid-foot region.

In some implementations, the heel region, the forefoot region, and the mid-foot region are separated by walls. In some scenarios, the walls extend substantially perpendicular to a longitudinal axis of the outsole. For instance, the walls may extend from the outsole toward a bottom surface of the footbed. In some examples, the walls are spaced apart from the bottom surface of the footbed. Alternatively, at least one of the walls is in contact with the bottom surface of the footbed. Optionally, each of the walls is in contact with the bottom surface of the footbed. The walls may prevent or restrict movement of the particulate matter between the heel region, the forefoot region, and the mid-foot region.

In yet another aspect of the disclosure, a method of making an article of footwear includes providing a cavity between a footbed and an outsole and providing the cavity with fibers that cooperate with one another to form a mesh that at least partially fills the cavity. The method also includes providing the mesh with particulate matter that is received within interstitial spaces of the mesh.

In some implementations, providing the cavity with the fibers includes attaching the fibers to one another. Providing the cavity with the fibers may also include fixing the fibers for movement with the outsole.

In some examples, providing the mesh with the particulate matter includes providing the mesh with foam beads. The method may include providing the mesh with foam beads having a substantially spherical shape. The method may include providing the mesh with foam beads having approximately the same size and shape or at least one of a different size and shape.

In some implementations, providing the mesh includes providing the mesh with a different density along a length of the outsole. In some examples, the method also includes providing the outsole with a heel region, a forefoot region, and a mid-foot region disposed between the heel region and the forefoot region. Providing the mesh may also include providing the mesh with a different density in at least one of the heel region, the forefoot region, and the mid-foot region. For instance, the mesh may have a different density in each of the heel region, the forefoot region, and the mid-foot region. In other examples, the mesh has a substantially constant density in each of the heel region, the forefoot region, and the mid-foot region.

Optionally, the method also includes providing walls to separate the heel region, the forefoot region, and the mid-foot region. In some examples, providing the walls includes extending the walls in a direction substantially perpendicular to a longitudinal axis of the outsole. In some scenarios, the method includes extending the walls from the outsole toward a bottom surface of the footbed. In these scenarios, at least one of the walls may be in contact with the bottom surface of the footbed. Alternatively, extending the walls toward a bottom surface of the footbed may include extending at least one of the walls into contact with the bottom surface of the footbed. While extending the walls toward a bottom surface of the footbed may include extending fewer than all of the walls into contact with the bottom surface of the footbed, extending the walls in a direction toward the bottom surface of the footbed may include placing each of the walls in contact with the bottom surface of the footbed. In some implementations, the method includes preventing or restricting movement of the particulate matter between the heel region, the forefoot region, and the mid-foot region.

Referring to FIGS. 1-5, in some implementations, an article of footwear 10 includes an upper 100 and a sole structure 200 attached to the upper 100. The article of footwear 10 may be divided into one or more portions. The portions may include a forefoot portion 12, a mid-foot portion 14 and a heel portion 16. The forefoot portion 12 may correspond with toes and joints connecting metatarsal bones with phalanx bones of a foot. The mid-foot portion 14 may correspond with an arch area of the foot, and the heel portion 16 may correspond with rear portions of the foot, including a calcaneus bone. The footwear 10 may include lateral and medial sides 18, 20, respectively, corresponding with opposite sides of the footwear 10 and extending through the portions 12, 14, 16.

The upper 100 includes interior surfaces that define an interior void 102 configured to receive and secure a foot for support on the sole structure 200. Ankle opening 104 in the heel portion 16 may provide access to the interior void 102. For example, the ankle opening 104 may receive a foot to secure the foot within the void 102 and facilitate entry and removal of the foot from and to the interior void 102. In some examples, one or more fasteners 106 extend along the upper 100 to adjust a fit of the interior void 102 around the foot while concurrently accommodating entry and removal of the foot therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort.

In some implementations, the sole structure 200 includes an outsole 210 and a midsole 220 arranged in a layered configuration. For example, the outsole 210 engages with a ground surface during use of the article of footwear 10 and the midsole 220 is disposed between the upper 100 and the outsole 210. In some examples, the sole structure 200 may also incorporate additional layers such as an insole or sockliner, which may reside within the interior void 102 of the upper 100 to receive a plantar surface of the foot to enhance the comfort of the footwear 10. In some examples, a sidewall 230 surrounds a perimeter of the outsole 210 and separates the outsole 210 and the midsole 220 to define a cavity 240 therebetween. The cavity 240 receives fibers 300 to provide cushioning for the foot as well as to control migration of particulate matter 350 residing in the cavity 240 during use of the footwear 10.

The fibers 300 may cooperate with one another to form a mesh 310 that at least partially fills the cavity 240. For example, the mesh 310 may rest on the outsole 210 and occupy a portion of the volume of the cavity 240. The mesh 310 and the particulate matter 350 may reside in the cavity 240 and may cooperate to enhance functionality and cushioning characteristics that a conventional midsole provides. For example, each fiber 300 may include one or more polymer foam materials, such as ethyl-vinyl-acetate or polyurethane, that cooperate with one another to form the mesh 310. The mesh 310 may be formed to a shape conforming to an outline of the foot. The polymer foam material fibers 300 may allow the mesh 310 to provide resilient compressibility under an applied load to attenuate ground-reaction forces, as well as to control movement of the particulate matter 350 also residing within the cavity 240. For example, the mesh 310 may define interstitial spaces 302 that receive the particulate matter 350. The individual fibers 300 may restrict unfettered movement of the particulate matter 350 within the cavity 240 and, more specifically, may restrict unfettered movement between the interstitial spaces 302. While the individual fibers 300 restrict unfettered movement of the particulate matter 350 within the cavity 240, the particulate matter 350 is permitted to move relative to the fibers 300 within the interstitial spaces 302 (i.e., around adjacent fibers 300). The interstitial spaces 302 refer to voids of volumetric free space within the mesh 310 that may be filled or occupied by the particulate matter 350.

In some examples, the particulate matter 350 includes foam beads sized and shaped to occupy the interstitial spaces 302 defined by the mesh 310. The foam beads 350 may include approximately the same size and shape. Conversely, in other scenarios, the foam beads 350 have at least one of a different size and shape. The foam beads 350 (e.g., particulate matter) may have a substantially spherical shape. By providing the foam beads 350 with the substantially spherical shape, the foam beads 350 are permitted to freely saturate the interstitial spaces 302 defined by the mesh 310 without becoming stuck on the fibers 300 and obstructing the dispersion of the foam beads 350 within the interstitial spaces 302.

In some examples, the outsole 210 includes a ground-engaging surface 212 and an opposite inner surface 214. The outsole 210 may attach to the upper 100. In some examples, the sidewall 230 extends from the perimeter of the outsole 210 and attaches to the midsole 220 or the upper 100. The example of FIG. 1 shows the outsole 210 attaching to the upper 100 proximate to a tip of the forefoot portion 12. The outsole 210 generally provides abrasion-resistance and traction with the ground surface during use of the article of footwear 10. The outsole 210 may be formed from one or more materials that impart durability and wear-resistance, as well as enhance traction with the ground surface. For example, rubber may form at least a portion of the outsole 210.

The midsole 220 may include a bottom surface 222 and a footbed surface 224 disposed on an opposite side of the midsole 220 than the bottom surface 222. The midsole 220 may be also referred to as a footbed. Accordingly, the terms midsole 220 and footbed 220 may be used interchangeably throughout this disclosure. Stitching 226 or adhesives may secure the midsole 220 to the upper 100. The footbed surface 224 may be contoured to conform to a profile of the bottom surface (e.g., plantar) of the foot. In some examples, an insole or sockliner may be disposed on the footbed surface 224 under the foot within at least a portion of the interior void 102 of the upper 100. The bottom surface 222 may oppose the inner surface 214 of the outsole 210 to define the cavity 240 therebetween.

The midsole 220 may be formed from a flexible material that allows a foot to conform to the mesh 310 and the particulate matter 350 residing in the cavity 240 during use of the article of footwear 10. In so doing, the flexible midsole 220 may be a flexible strobel that allows the mesh 310 and the particulate matter 350 residing in the cavity 240 to interact with the profile of the bottom surface of the foot during gradient loading of the sole structure 200. In some examples, the sidewall 230 may define a perimeter of the cavity 240 as well as a depth of the cavity 240 based on a length of separation between the bottom surface 222 and the inner surface 214. One or more polymer foam materials may form the sidewall 230 to provide resilient compressibility under applied loads to attenuate ground-reaction forces.

Figure 2:
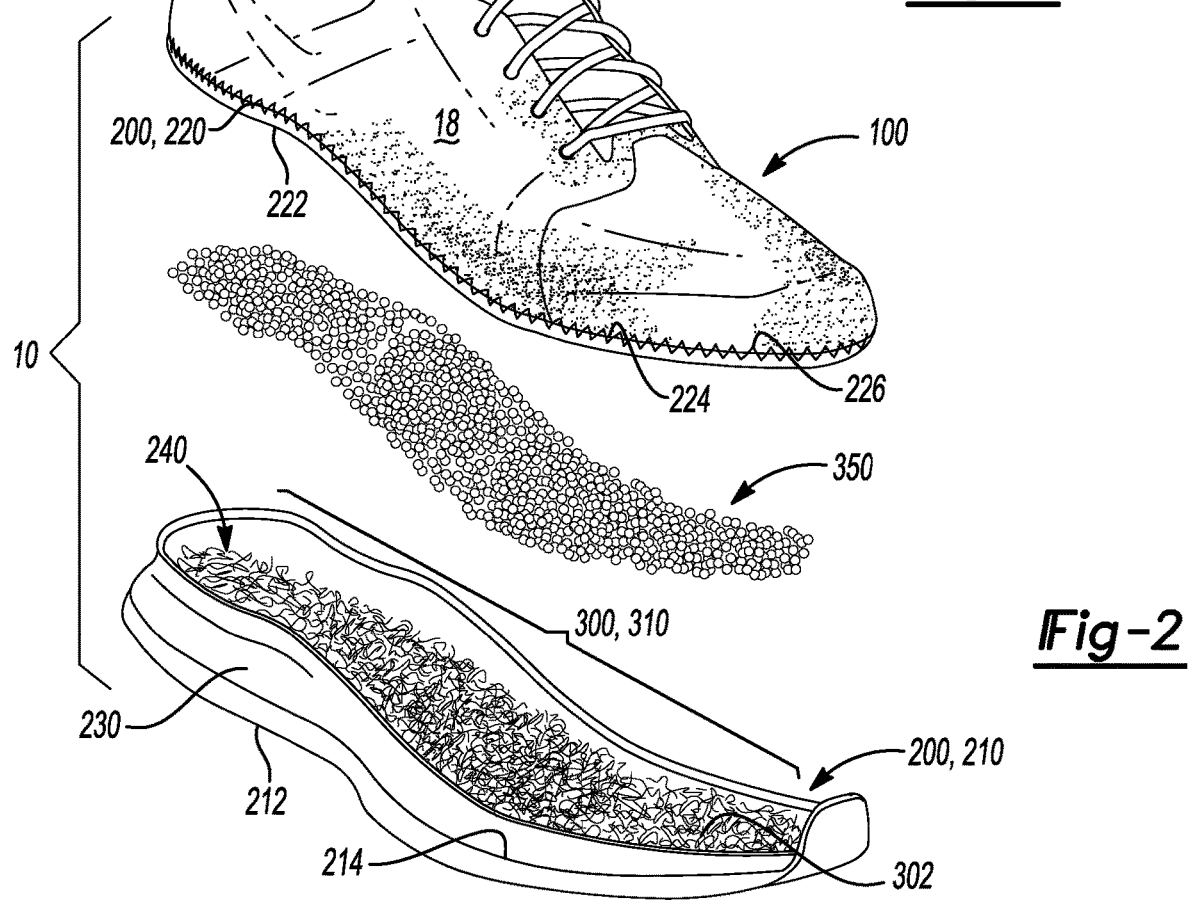
FIG. 2 is an exploded view of the article of footwear of FIG. 1 showing fibers and particulate matter received within a cavity between an inner surface of an outsole and a bottom surface of a midsole.

FIG. 2 provides an exploded view of the article of footwear 10 showing the mesh 310 formed by the fibers 300 and residing within the cavity 240 on the inner surface 214 of the outsole 210. The mesh 310 may be fixed for movement with the outsole 210. For example, the mesh 310 and the outsole 210 may flex, bend, or otherwise deform, when the sole structure 200 is under an applied load, such as during walking, running, or jumping. The example of FIG. 2 shows the particulate matter 350 (e.g., foam beads) disposed in the cavity 240 and residing within the interstitial spaces 302 of the mesh 310.

Referring to FIG. 3, a schematic cross-sectional view taken along line 3-3 of FIG. 1 shows the mesh 310 residing within the cavity 240 between the inner surface 214 of the outsole 210 and the bottom surface 222 of the midsole 220. The inner surface 214 of the outsole 210 and the bottom surface 222 of the midsole (e.g., footbed) 220 are arranged in parallel and oppose one another to define a longitudinal axis L of the sole structure 200 that extends through the forefoot portion 12, the mid-foot portion 14, and the heel portion 16. The example shows the particulate matter 350 (e.g., foam beads) residing within the interstitial spaces 302 of the mesh 310. The fibers 300 may permit the particulate matter 350 occupying a corresponding interstitial space 302 to move thereabout relative to neighboring fibers 300 that define the interstitial space 302. Accordingly, the fibers 300 restrict unfettered movement of the particulate matter within the mesh 310, thereby preventing the particulate matter 350 from migrating throughout the cavity 240 of the sole structure 200 during repeated compressions. If, on the other hand, the particulate matter 350 was loosely dispersed within the cavity 240 without the mesh 310, the particulate matter 350 would be allowed to freely migrate throughout the sole structure 200 during repeated compressions, thereby resulting in little to no cushioning in areas of the sole structure 200.

FIG. 4 is a detailed view within dashed box 4 of FIG. 3 showing the fibers 300 and the particulate matter 350 residing in the cavity 240 proximate to the mid-foot portion 14 of the sole structure 200. FIG. 4 shows the interstitial spaces 302 defined by the mesh 310 that create voids for the particulate matter 350 to settle and move relative to adjoining fibers 300. In some examples, the fibers 300 are attached to one another to form the mesh 310. Optionally, one or more of the fibers 300 may be unattached and cooperate with attached fibers 300 to form the mesh 310. In other examples, all of the fibers 300 are unattached and cooperate to form the mesh 310. Moreover, the fibers 300 may be moveable relative to one another to permit fixed movement of the mesh 310 with the outsole 210. For example, the fibers 300 may compress in response to ground-reaction forces or in response to flexing or bending of the outsole 210, thereby causing the fibers 300 to move relative to one another and the mesh 310 to move relative to the outsole 210 that is flexing or bending. While the fibers 300 are described and shown as being individual fibers 300, the mesh 310 could be formed from a single fiber that is woven into the configuration of the mesh 310.

FIGS. 3 and 4 show the mesh 310 residing in the cavity 240 between the bottom surface 222 of the midsole 220 and the inner surface 214 of the outsole, the particulate matter 350 residing within the interstitial spaces 302 defined by the mesh 310, and the fibers 300 restricting unfettered movement of the particulate matter 350 throughout the sole structure 200 while allowing some movement of the particulate matter 350 relative to the adjoining fibers 300. Accordingly, during gradient loading of the sole structure 200, such as during a walking or running movement, the mesh 310 and the particulate matter 350 may cooperate to provide cushioning from soft to responsive. For instance, the particulate matter 350 may provide a level of soft-type cushioning during the initial impact of a ground-reaction force while compression by the mesh 310 and individual fibers 300 may provide a level of responsive-type cushioning. The particulate matter 350 and the mesh 310 may compress by the midsole 220 translating toward the outsole 210 in response to a ground-reaction force. Implementing the fibers 300 restricts the particulate matter 350 from migrating throughout the sole structure 200, thereby allowing the particulate matter 350 to be dispersed and effectively contained at designated areas within the cavity 240 to consistently achieve desirable cushioning characteristics. Moreover, by allowing the particulate matter 350 to move about corresponding interstitial spaces 302 relative adjoining fibers 300, the level of soft-type cushioning may be dynamically distributed based on the direction and magnitude of the ground-reaction force being applied to the sole structure 200.

In some implementations, a length of the sole structure 200 is defined along the longitudinal axis L through the forefoot, mid-foot, and heel portions 12, 14, 16, respectively. The mesh 310 may include a different density along the length of the sole structure 200 (e.g., midsole 220 and outsole 210). For instance, the mesh 310 may include a different density in at least one of the heel portion 16, the forefoot portion 12, and the mid-foot portion 14. In some examples, the density of the mesh 310 is different in each of the heel portion 16, the forefoot portion 12, and the mid-foot portion 14. In other examples, the density of the mesh 310 is substantially constant in each of the heel portion 16, the forefoot portion 12, and the mid-foot portion 14.

The density of the mesh 310 correlates to the level of responsive-type cushioning that the mesh 310 provides when under an applied load, while also prescribing the quantity of the particulate matter 350 permitted to reside within the interstitial spaces 302 of the mesh 310. For example, increasing the density of the mesh 310 causes the level of responsive-type cushioning provided by the mesh 310 to increase and the volume of the interstitial spaces 302 (e.g., voids) to reduce, thereby resulting in a reduction of the quantity of particulate matter 350 permitted to reside within the interstitial spaces 302. Conversely, decreasing the density of the mesh 310 increases the volume of the interstitial spaces 302, thereby resulting in the quantity of particulate matter 350 permitted to reside within the interstitial spaces 302 to increase. Accordingly, the level of soft-type cushioning provided by the particulate matter 350 increases as the quantity of particulate matter 350 increases and the level of responsive-type cushioning decreases when the density of the mesh 310 decreases.

Figure 5:
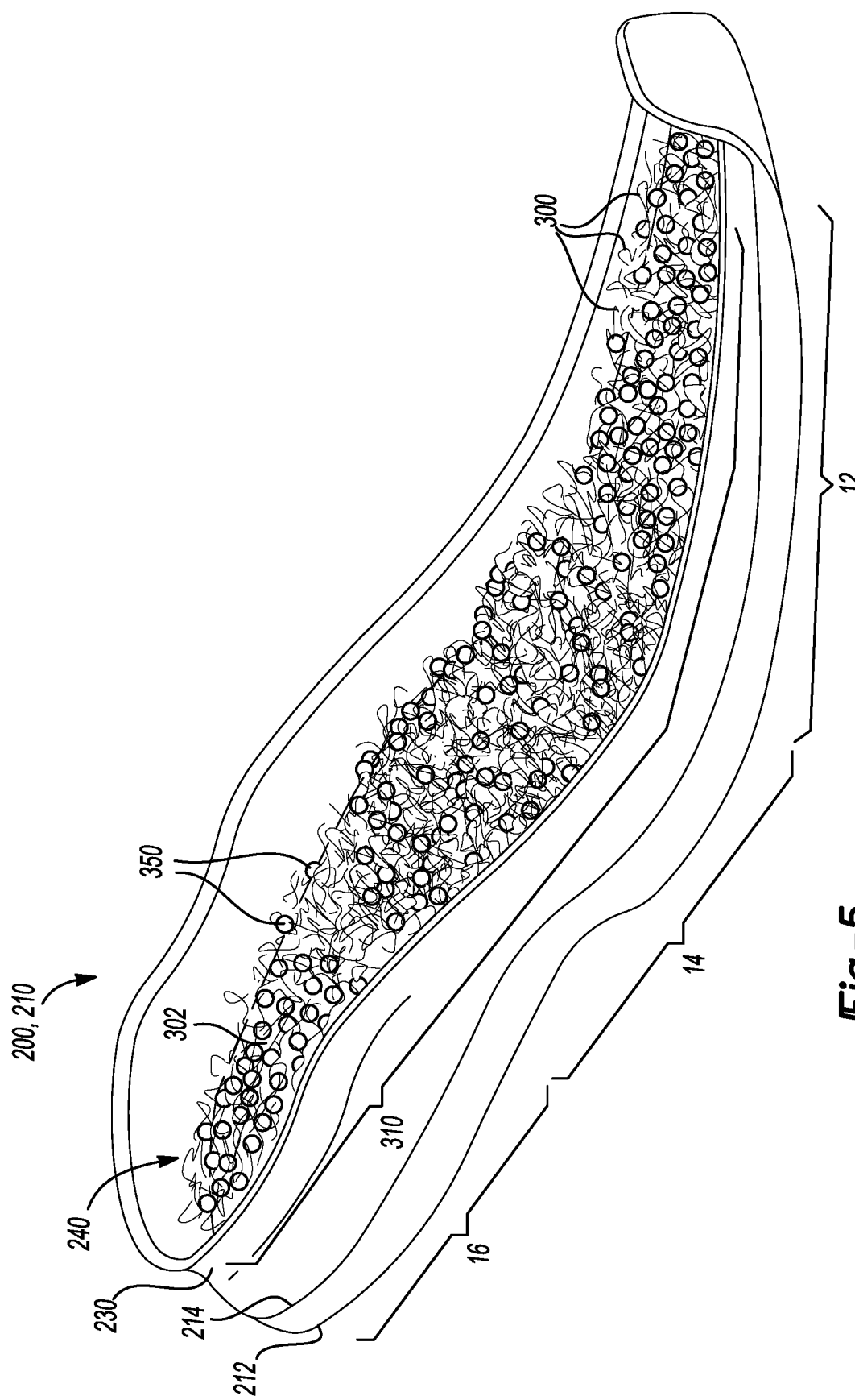
FIG. 5 is a top perspective view of an outsole of the article of footwear of FIG. 1 showing mesh formed by fibers received within a cavity defined by an outsole, a wall surrounding a perimeter of the outsole, and particulate matter received within interstitial spaces defined by the mesh.

Referring to FIG. 5, in some examples, providing the mesh 310 with a different density in at least one of the forefoot, mid-foot, and heel portions 12, 14, 16 permits the quantity of the particulate matter 350 disposed within the cavity 240 to be different at corresponding ones of the forefoot, mid-foot, and heel portions 12, 14, 16. FIG. 5 shows the mesh 310 having a greater density at the mid-foot portion 14 than the forefoot and heel portions 12, 16, respectively. Accordingly, the forefoot and heel portions 12, 16 include interstitial spaces 302 having a greater volume compared to a volume of the interstitial spaces 302 at the mid-foot portion 14, thereby permitting a higher ratio of particulate matter 350 disposed within the cavity 240 at each of the forefoot and heel portions 12, 16 than the ratio of particulate matter 350 disposed within the cavity 240 at the mid-foot portion 14. In some examples, disposing higher ratios of particulate matter 350 within the cavity 240 at the forefoot and heel portions 12, 16 advantageously allows for the level of soft-type cushioning to be increased in the both the heel portion 16, where initial impacts of a ground-reaction force are likely to occur and the forefoot portion 12, where a ground-reaction force increases in response to the ground-engaging surface 212 of the outsole 210 pushing off the ground surface to propel the foot forward. At the same time, the higher density mesh 310 at the mid-foot portion 14 advantageously increases the level of responsive-type cushioning as the ground-engaging surface 212 rolls for engagement with the ground surface between the heel portion 16 and the forefoot portion 12.

The examples of FIGS. 1-5 show that the density of the mesh 310 and the volume of the mesh 310 occupying the cavity 240 effectuates the quantity of particulate matter 350 residing in the cavity 240 and the cushioning characteristics provided when the sole structure 200 is under applied loads, such as during a walking or running movement. For example, increasing the density of the mesh 310 at one or more portions of the sole structure 200 may increase the level of responsive-type cushioning and may decrease the level of soft-type cushioning. In this example, the level of soft-type cushioning decreases as a result of the density of the mesh 310 increasing to cause the volume of the interstitial spaces 302 to be reduced, thereby resulting in a reduction in the quantity of particulate matter 350 permitted to reside in those interstitial spaces 302. Moreover, the individual fibers 300 that form the mesh 310 cooperate to restrict unfettered movement by the particulate matter 350 throughout the cavity 240 after repeated compressions by the sole structure 200. The mesh 310 may also permit the particulate matter 350 residing in the interstitial spaces 302 to move relative to the fibers 300 that adjoin the corresponding interstitial spaces 302 in response to a ground-reaction force.

Figure 6:
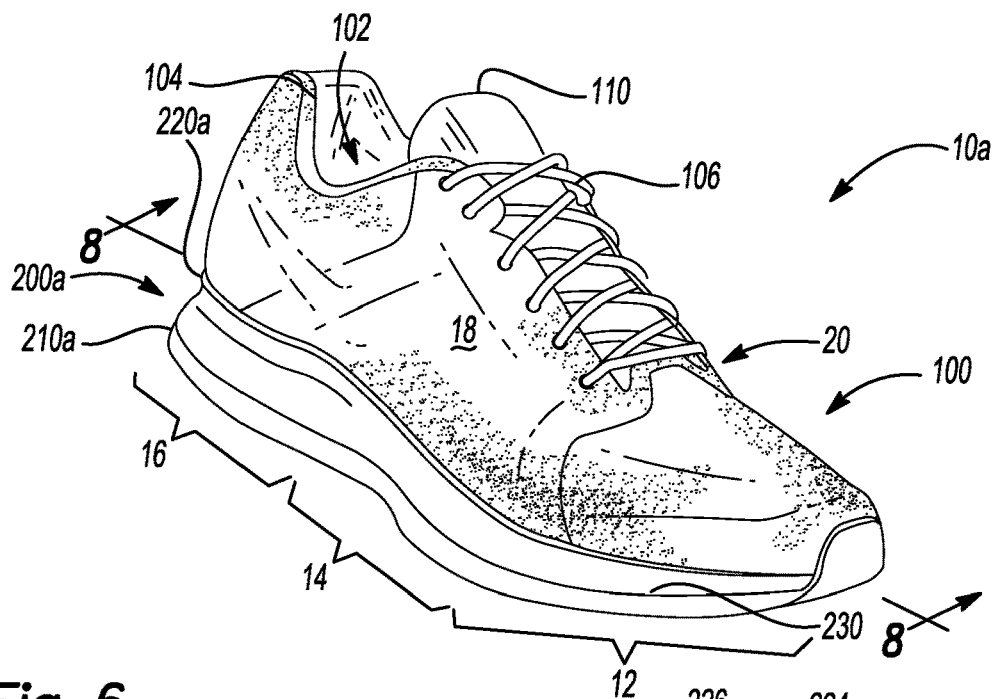
FIG. 6 is a top perspective view of an article of footwear in accordance with principles of the present disclosure.
Figure 7:
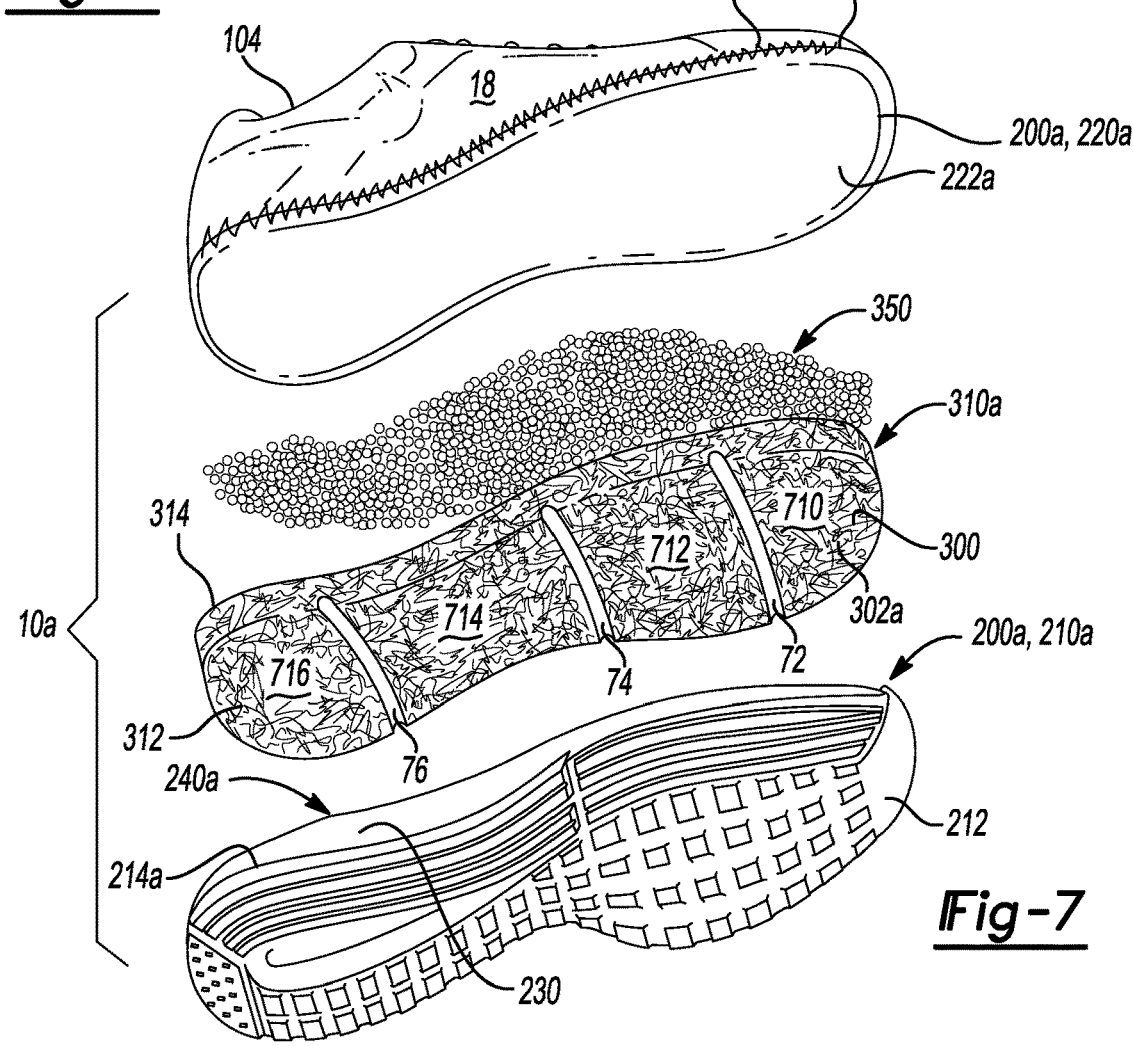
FIG. 7 is an exploded view of the article of footwear of FIG. 6 showing fibers forming four regions of mesh received within a cavity between an inner surface of an outsole and a bottom surface of a midsole.
Figure 8:
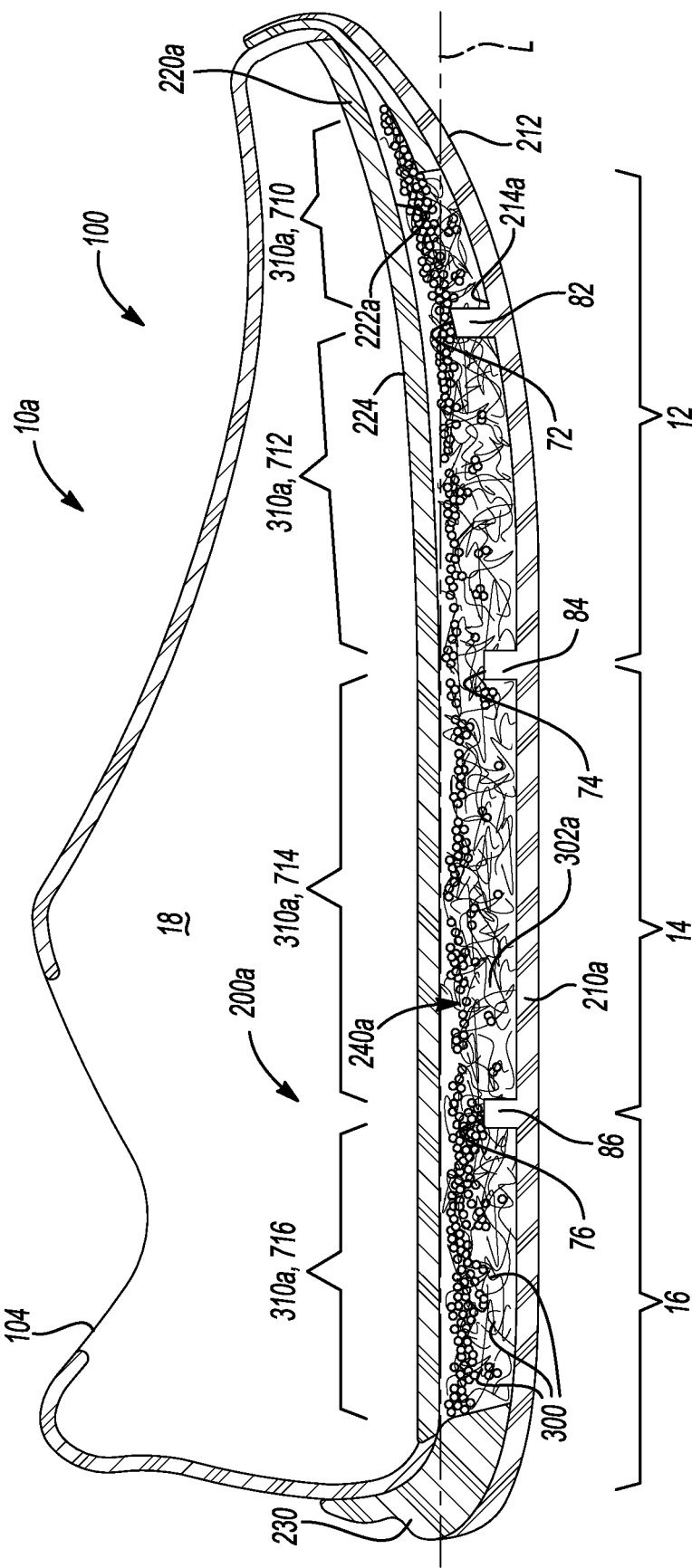
FIG. 8 is a cross-sectional view taken along line 8-8 of FIG. 6 showing walls extending from an inner surface of an outsole in a direction toward a bottom surface of a midsole to divide a mesh that defines interstitial spaces for receiving particulate matter into two or more regions.

Referring to FIGS. 6-8, in some implementations, an article of footwear 10a includes an upper 100 and a sole structure 200a attached to the upper 100. In view of the substantial similarity in structure and function of the components associated with the article of footwear 10 with respect to the article of footwear 10a, like reference numerals are used hereinafter and in the drawings to identify like components while like reference numerals containing letter extensions are used to identify those components that have been modified.

The sole structure 200a may include an outsole 210a and a midsole 220a (e.g., also referred to as a footbed 220a) arranged in the layered configuration. The sidewall 230 may surround the perimeter of the outsole 210a and may separate the outsole 210a and the midsole 220a to define a cavity 240a therebetween. The outsole 210a includes an inner surface 214a disposed on an opposite side of the outsole 210a than the ground-engaging surface 212. The midsole 220a includes a bottom surface 222a disposed on an opposite side of the midsole 220a than the footbed surface 224. The bottom surface 222a opposes the inner surface 214a and the sidewall 230 may separate the bottom surface 222a and the inner surface 214a to define a depth of the cavity 240a.

In some implementations, the fibers 300 cooperate with one another to form a mesh 310a. FIG. 7 is an exploded view of the article of footwear 10a showing the mesh 310a partially filling the cavity 240a and particulate matter 350 that may be within interstitial spaces 302a defined by the mesh 310a. The interstitial spaces 302a define a volumetric space or void for receiving and containing a quantity of the particulate matter 350, as described above with respect to the article of footwear 10. In other words, particulate matter 350 disposed within the cavity 240a settles within the interstitial spaces 302a and is confined by adjoining fibers 300. A bottom surface 312 of the mesh 310a may be disposed on the inner surface 214a of the outsole 210a, while the perimeter of the mesh 310 may be enclosed by the sidewall 230. A top surface 314 of the mesh 310a opposes the bottom surface 222a of the midsole 220a. The mesh 310a may entirely or partially fill a depth of the cavity 240a defined by the sidewall 230 separating the outsole 210a and the midsole 220a. The midsole 220a may be formed from the flexible material forming the midsole 220 of FIGS. 1-5 to provide the midsole 220a with sufficient flexibility, thereby allowing the mesh 310a and the particulate matter 350 residing in the cavity 240a to interact with the profile of the bottom surface of the foot during gradient loading of the sole structure 200a.

In some examples, the mesh 310a forms one or more grooves 72, 74, 76 extending between the lateral and medial sides 18, 20 and also from the bottom surface 312 toward the top surface 314 of the mesh 310a. One groove 72 may be located proximate to the forefoot portion 12 of the sole structure 200a, another groove 74 may be located proximate to the mid-foot portion 14 of the sole structure 200a, and another groove 76 may be located proximate to the heel portion 16 of the sole structure 200a. In some configurations, a toe region 710 of the mesh 310a is formed to the right of the groove 72 relative to the view shown in FIG. 7, a forefoot region 712 is formed between the grooves 72 and 74, a mid-foot region 714 is formed between the grooves 74 and 76, and a heel region 716 is formed to the left of the groove 76 relative to the view shown in FIG. 7. In other configurations, the groove 72 may be omitted and the forefoot region 712 may be formed to the right of the groove 74 and may additionally include the volume of the toe region 710.

In some configurations, the grooves 72-76 terminate within the mesh 310a and corresponding gaps separate the top surface 314 and the grooves 72-76, thereby allowing some particulate matter 350 to migrate between adjoining regions 712-716 via the gaps. However, particulate matter 350 residing below the distal ends of the grooves 72-76 will be restricted from unfettered movement between adjoining regions 712-716 due to the corresponding grooves 72-76 acting as barriers or walls that separate the corresponding regions 712-716. Conversely, other configurations may include one or more of the grooves 72-76 terminating at a corresponding point of contact with the top surface 314 to prevent any migration or movement between adjoining regions 712-716.

In some examples, the mesh 310a has a substantially constant density in each of the one or more regions 710-716. In other examples, the mesh 310a has a different density in each of the one or more regions 710-716 or a different density in at least one of the regions 710-716. Accordingly, different quantities of particulate matter 350 may reside within the interstitial spaces 302a defined by the corresponding regions 710-716 based on the densities thereof to provide desired cushioning characteristics in each of the regions 710-716. In some configurations, one or more of the grooves 72-76 may be omitted and the one or more regions 710-716 may be formed based on varying the density of the mesh 310a.

FIG. 8 shows a schematic cross-sectional view taken along line 8-8 of FIG. 6 showing the mesh 310a partially filling the cavity 240a and the particulate matter 350 disposed within the cavity 240a and residing within the interstitial spaces 302a defined by the mesh 310a. In some implementations, a series of walls 82, 84, 86 extend between the lateral and medial sides 18, 20 and also extend substantially perpendicular to the longitudinal axis L of the sole structure 200a (e.g., midsole 220a and outsole 210a) from the inner surface 214a of the outsole 210a toward the bottom surface 222a of the midsole 220a (e.g., footbed). In some scenarios, the outsole 210a forms the series of walls 82-84 that bend upward from the inner surface 214a in the direction toward the midsole 220a. In some examples, each wall 82, 84, 86 is contoured to receive corresponding ones of the grooves 72, 74, 76 formed in the mesh 310a. In other examples, one or more of the grooves 72, 74, 76 may be omitted, as shown in FIG. 8.

One wall 82 may be located proximate to the forefoot portion 12 of the sole structure 200a, another wall 84 may be located proximate to the mid-foot portion 14 of the sole structure 200a, and another wall 86 may be located proximate to the heel portion 16 of the sole structure 200a. In some configurations, the series of walls 82-86 cooperate with the mesh 310a to form the toe region 710 of the mesh 310a to the right of the wall 82 relative to the view shown in FIG. 8, the forefoot region 712 between the walls 82 and 84, the mid-foot region 714 between the walls 84 and 86, and the heel region 716 to the left of the wall 86 relative to the view shown in FIG. 8. In other configurations, the wall 82 may be omitted and the forefoot region 712 may be formed to the right of the wall 84 relative to the view shown in FIG. 8. Thus, the walls 82-86 may cooperate with the mesh 310a with or without the grooves 72-76 to form and separate the regions 710-716.

The example of FIG. 8 shows each of the walls 82, 84, 86 extending from the inner surface 214a of the outsole 210a in a direction toward the midsole 220a and terminating within the cavity 240a without contacting the bottom surface 222a of the midsole 220a. The termination of the walls 82-86 within the cavity 240a defines corresponding gaps that separate the bottom surface 222a and distal ends of the walls 82-86, thereby allowing some particulate matter 350 to migrate between adjoining regions 710-716 via the gaps. However, particulate matter 360 residing below the distal ends of the walls 82-86 is restricted from movement between adjoining regions 710-716. In other words, the walls 82-86 restrict movement of particulate matter 350 that resides below the distal ends between adjoining regions 710-716, while the particulate matter 350 that resides above the distal ends, is permitted to migrate between adjoining regions 710-716 via the gaps.

As discussed above, the mesh 310a may have a substantially constant density in each of the regions 710-716 in some examples while in other examples, the mesh 310a may have a different density in at least one of the regions 710-716 or a different density in each of the regions 710-716. For example, FIG. 8 shows the mesh 310a having a lower density at the toe, forefoot, and heel regions 710, 712, 716, respectively, than the density of the mesh 310a at the mid-foot region 714, thereby resulting in a greater proportion of particulate matter 350 residing within the interstitial spaces 302a of the mesh 310a at the toe, forefoot, and heel regions 710, 712, 716, respectively, than the proportion of particulate matter 350 residing within the interstitial spaces 302a at the mid-foot region 714. Accordingly, the level of soft-type cushioning may be desirably increased in the toe, forefoot, and heel regions 710, 712, 716, respectively, and the level of responsive-type cushioning may be increased in the mid-foot region 714.

Referring to FIGS. 9 and 10, in some implementations, an article of footwear 10b includes an upper 100 and a sole structure 200b attached to the upper 100. In view of the substantial similarity in structure and function of the components associated with the article of footwear 10 with respect to the article of footwear 10b, like reference numerals are used hereinafter and in the drawings to identify like components while like reference numerals containing letter extensions are used to identify those components that have been modified.

The sole structure 200b may include an outsole 210b and a midsole 220b (e.g., also referred to as a footbed 220b) arranged in the layered configuration. The sidewall 230 may surround the perimeter of the outsole 210b and may separate the outsole 210b and the midsole 220b to define a cavity 240b (FIG. 10) therebetween. The outsole 210b includes an inner surface 214b disposed on an opposite side of the outsole 210b than the ground-engaging surface 212. The midsole 220b includes a bottom surface 222b disposed on an opposite side of the midsole 220b than the footbed surface 224. The bottom surface 222b opposes the inner surface 214b and the sidewall 230 may separate the bottom surface 222b and the inner surface 214b to define a depth of the cavity 240b.

FIG. 10 shows a cross-sectional view taken along line 10-10 of FIG. 9. The fibers 300 may cooperate with one another to form a mesh 310b that partially fills the cavity 240b and particulate matter 350 that resides within interstitial spaces 302b defined by the mesh 310b. The interstitial spaces 302b define a volumetric space or void for receiving and containing a quantity of the particulate matter 350. In other words, particulate matter 350 disposed within the cavity 240b settles within the interstitial spaces 302b and is confined by adjoining fibers 300. The mesh 310b may entirely or partially fill a depth of the cavity 240b defined by the sidewall 230 separating the outsole 210b and the midsole 220b. The mesh 310b may form one or more grooves 172, 174, 176 indicative of the grooves 72, 74, 76 formed in the mesh 310a, as described in above with reference to FIGS. 6-8. In some scenarios, the mesh 310b does not have grooves 172, 174, 176.

In some implementations, a series of walls 182, 184, 186 extend between the lateral and medial sides 18, 20 and also extend substantially perpendicular to the longitudinal axis L of the sole structure 200b (e.g., midsole 220b and outsole 210b) from the inner surface 214b of the outsole 210b and are in contact with the bottom surface 222b of the midsole 220b. In some scenarios, the outsole 210b forms the series of walls 182-184 that bend upward from the inner surface 214b in the direction toward the midsole 220b. When the mesh 310b includes grooves 172-176, each wall 182, 184, 186 is contoured to receive corresponding ones of the grooves 172, 174, 176 formed in the mesh 310b.

One wall 182 may be located proximate to the forefoot portion 12 of the sole structure 200b, another wall 184 may be located proximate to the mid-foot portion 14 of the sole structure 200b, and another wall 184 may be located proximate to the heel portion 16 of the sole structure 200b. In some configurations, a toe region 810 of the mesh 310b is formed to the right of the wall 182 relative to the view shown in FIG. 10, a forefoot region 812 is formed between the walls 182 and 184, a mid-foot region 814 is formed between the walls 184 and 186, and a heel region 816 is formed to the left of the wall 186 relative to the view shown in FIG. 10. In other configurations, the wall 182 may be omitted and the forefoot region 812 may be formed to the right of the wall 184 relative to the view shown in FIG. 10 and may additionally include the volume of the toe region 810. Thus, when the mesh 310b at least partially fills the cavity 240b, the walls 182-186 separate the mesh 310b into the toe region 810, the forefoot region 812, the mid-foot region 814, and the heel region 816.

The example of FIG. 10 shows each of the walls 182, 184, 186 extending from the inner surface 214b of the outsole 210b in a direction toward the midsole 220b and terminating within the cavity 240b at a point of contact with the bottom surface 222b of the midsole 220b. In some examples, at least one of the walls 182, 184, 186 is in contact with the bottom surface 222b while other walls may terminate within the cavity 240a and have corresponding distal ends that are spaced apart from the bottom surface 222b. The termination of the walls 182-186 at the point of contact with the bottom surface 222b entirely separates and isolates the regions 810-816, thereby preventing movement of the particulate matter 350 from one region 810-816 to another.

In some examples, the mesh 310b has a substantially constant density in each of the regions 810-816. Conversely, in other examples, the mesh 310a has a different density in at least one of the regions 810-816 or a different density in each of the regions 810-816. For example, FIG. 10 shows the mesh 310b having a lower density at the toe, forefoot, and heel regions 810, 812, 816, respectively, than the density of the mesh 310b at the mid-foot region 814, thereby resulting in a greater proportion of particulate matter 350 residing within the interstitial spaces 302b of the mesh 310b at the toe, forefoot, and heel regions 810, 812, 816, respectively, than the proportion of particulate matter 350 residing within the interstitial spaces 302b at the mid-foot region 814. Accordingly, the level of soft-type cushioning may be desirably increased in the toe, forefoot and heel regions 810, 812, 816, respectively, and the level of responsive-type cushioning may be increased in the mid-foot region 814. The midsole 220b may be formed from the flexible material forming the midsole 220 of FIGS. 1-5 to provide the midsole 220b with sufficient flexibility, thereby allowing the mesh 310b and the particulate matter 350 residing in the cavity 240b to interact with the profile of the bottom surface of the foot during gradient loading of the sole structure 200b.

Referring to FIGS. 11 and 12, in some implementations, an article of footwear 10c includes an upper 100 and a sole structure 200c attached to the upper 100. In view of the substantial similarity in structure and function of the components associated with the article of footwear 10 with respect to the article of footwear 10c, like reference numerals are used hereinafter and in the drawings to identify like components while like reference numerals containing letter extensions are used to identify those components that have been modified.

The sole structure 200c may include an outsole 210c and a midsole 220c (e.g., also referred to as a footbed 220c) arranged in the layered configuration. The sidewall 230 may surround the perimeter of the outsole 210c and may separate the outsole 210c and the midsole 220c to define a cavity 240c (FIG. 12) therebetween. The outsole 210c includes an inner surface 214c disposed on an opposite side of the outsole 210c than the ground-engaging surface 212. The midsole 220c includes a bottom surface 222c disposed on an opposite side of the midsole 220c than the footbed surface 224. The bottom surface 222c opposes the inner surface 214c and the sidewall 230 may separate the bottom surface 222c and the inner surface 214c to define a depth of the cavity 240c.

FIG. 12 shows a cross-sectional view taken along line 12-12 of FIG. 11. The fibers 300 may cooperate with one another to form a mesh 310c that partially fills the cavity 240c and particulate matter 350 that resides within interstitial spaces 302c defined by the mesh 310c. The interstitial spaces 302c define a volumetric space or void for receiving and containing a quantity of the particulate matter 350. In other words, particulate matter 350 disposed within the cavity 240c settles within the interstitial spaces 302c and is confined by adjoining fibers 300. Quantities of particulate matter 350 may move within their interstitial spaces 302c, but are restricted from unfettered movement throughout the cavity 240c by the adjoining fibers 300. The mesh 310c may entirely or partially fill a depth of the cavity 240c defined by the sidewall 230 separating the outsole 210c and the midsole 220c.

In some examples, the mesh 310c has a substantially constant density along a length of the sole structure 200c (e.g., midsole 220c and outsole 210c) that extends along the longitudinal axis from the forefoot portion 12 to the heel portion 16. Conversely, in other examples, the mesh 310c has a different density along the length of the sole structure 200c. For example, FIG. 12 shows the mesh 310c having a lower density at the forefoot and heel portions 12, 16, respectively, than the density of the mesh 310c at the mid-foot portion 14, thereby resulting in a greater proportion of particulate matter 350 residing within the interstitial spaces 302c of the mesh 310c at the forefoot and heel portions 12, 16, respectively, than the proportion of particulate matter 350 residing within the interstitial spaces 302c at the mid-foot portion 14. Accordingly, the level of soft-type cushioning may be desirably increased in the forefoot and heel portions 12, 16, respectively, and the level of responsive-type cushioning may be increased in the mid-foot portion 14. The midsole 220c may be formed from the flexible material forming the midsole 220 of FIGS. 1-5 to provide the midsole 220c with sufficient flexibility, thereby allowing the mesh 310c and the particulate matter 350 residing in the cavity 240c to interact with the profile of the bottom surface of the foot during gradient loading of the sole structure 200c.

The following Clauses provide an exemplary configuration for the sole structure for an article of footwear described above.

Clause 1: An article of footwear comprising an upper and an outsole attached to the upper and including a ground-engaging surface, an inner surface formed on an opposite side of the outsole than the ground-engaging surface, and a wall surrounding a perimeter of the outsole, the wall cooperating with the inner surface to define a cavity. The midsole disposed between the upper and the outsole and including a footbed and a bottom surface disposed on an opposite side of the midsole than the footbed and opposing the inner surface of the outsole. Fibers received within the cavity and cooperating with one another to form a mesh that at least partially fills the cavity and particulate matter disposed within the cavity and received within interstitial spaces of the mesh.

Clause 2: The article of footwear of Clause 1, wherein the particulate matter is permitted to move relative to the fibers.

Clause 3: The article of footwear of Clause 2, wherein the fibers restrict unfettered movement of the particulate matter within the mesh.

Clause 4: The article of footwear of Clause 1, wherein the fibers are attached to one another.

Clause 5: The article of footwear of Clause 1, wherein the fibers are moveable relative to one another.

Clause 6: The article of footwear of Clause 1, wherein the mesh is fixed for movement with the outsole.

Clause 7: The article of footwear of Clause 1, wherein the particulate matter includes foam beads.

Clause 8: The article of footwear of Clause 7, wherein the foam beads include a substantially spherical shape.

Clause 9: The article of footwear of Clause 7, wherein the foam beads include approximately the same size and shape.

Clause 10: The article of footwear of Clause 7, wherein the foam beads include at least one of a different size and shape.

Clause 11: The article of footwear of any of the preceding Clauses, wherein the mesh includes a different density along a length of the midsole.

Clause 12: The article of footwear of Clause 1, wherein the midsole includes a heel region, a forefoot region, and a mid-foot region disposed between the heel region and the forefoot region.

Clause 13: The article of footwear of Clause 12, wherein the mesh has a different density in at least one of the heel region, the forefoot region, and the mid-foot region.

Clause 14: The article of footwear of Clause 12, wherein the mesh has a substantially constant density in each of the heel region, the forefoot region, and the mid-foot region.

Clause 15: The article of footwear of Clause 12, wherein the mesh has a different density in each of the heel region, the forefoot region, and the mid-foot region.

Clause 16: The article of footwear of Clause 12, wherein the heel region, the forefoot region, and the mid-foot region are separated from one another by walls.

Clause 17: The article of footwear of Clause 16, wherein the walls extend substantially perpendicular to a longitudinal axis of the midsole.

Clause 18: The article of footwear of Clause 16, wherein the walls extend from the inner surface of the outsole toward the midsole.

Clause 19: The article of footwear of Clause 18, wherein the walls are spaced apart from the bottom surface of the midsole.

Clause 20: The article of footwear of Clause 18, wherein at least one of the walls is in contact with the bottom surface of the midsole.

Clause 21: The article of footwear of Clause 18, wherein each of the walls is in contact with the bottom surface of the midsole.

Clause 22: The article of footwear of Clause 16, wherein the walls prevent movement of the particulate matter between the heel region, the forefoot region, and the mid-foot region.

Clause 23: The article of footwear of Clause 16, wherein the walls restrict movement of the particulate matter between the heel region, the forefoot region, and the mid-foot region.

Clause 24: An article of footwear comprising an upper and an outsole attached to the upper and including a ground-engaging surface. The footbed disposed between the upper and the outsole. The fibers disposed between the outsole and the footbed and cooperating with one another to form a mesh that at least partially fills a cavity between the outsole and the footbed and particulate matter disposed within the cavity and received within interstitial spaces of the mesh.

Clause 25: The article of footwear of Clause 24, wherein the particulate matter is permitted to move relative to the fibers.

Clause 26: The article of footwear of any of the preceding Clauses, wherein the fibers restrict unfettered movement of the particulate matter within the mesh.

Clause 27: The article of footwear of Clause 24, wherein the fibers are attached to one another.

Clause 28: The article of footwear of Clause 24, wherein the fibers are moveable relative to one another.

Clause 29: The article of footwear of Clause 24, wherein the mesh is fixed for movement with the outsole.

Clause 30: The article of footwear of Clause 24, wherein the particulate matter includes foam beads.

Clause 31: The article of footwear of Clause 30, wherein the foam beads include a substantially spherical shape.

Clause 32: The article of footwear of Clause 30, wherein the foam beads include approximately the same size and shape.

Clause 33: The article of footwear of Clause 30, wherein the foam beads include at least one of a different size and shape.

Clause 34: The article of footwear of any of the preceding Clauses, wherein the mesh includes a different density along a length of the outsole.

Clause 35: The article of footwear of Clause 24, wherein the outsole includes a heel region, a forefoot region, and a mid-foot region disposed between the heel region and the forefoot region.

Clause 36: The article of footwear of Clause 35, wherein the mesh has a different density in at least one of the heel region, the forefoot region, and the mid-foot region.

Clause 37: The article of footwear of Clause 35, wherein the mesh has a substantially constant density in each of the heel region, the forefoot region, and the mid-foot region.

Clause 38: The article of footwear of Clause 35, wherein the mesh has a different density in each of the heel region, the forefoot region, and the mid-foot region.

Clause 39: The article of footwear of Clause 35, wherein the heel region, the forefoot region, and the mid-foot region are separated from one another by walls.

Clause 40: The article of footwear of Clause 39, wherein the walls extend substantially perpendicular to a longitudinal axis of the outsole.

Clause 41: The article of footwear of Clause 39, wherein the walls extend from the outsole toward a bottom surface of the footbed.

Clause 42: The article of footwear of Clause 41, wherein the walls are spaced apart from the bottom surface of the footbed.

Clause 43: The article of footwear of Clause 41, wherein at least one of the walls is in contact with the bottom surface of the footbed.

Clause 44: The article of footwear of Clause 41, wherein each of the walls is in contact with the bottom surface of the footbed.

Clause 45: The article of footwear of Clause 39, wherein the walls prevent movement of the particulate matter between the heel region, the forefoot region, and the mid-foot region.

Clause 46: The article of footwear of Clause 39, wherein the walls restrict movement of the particulate matter between the heel region, the forefoot region, and the mid-foot region.

Clause 47: A method of making an article of footwear. The method comprising providing a cavity between a footbed and an outsole, providing the cavity with fibers that cooperate with one another to form a mesh that at least partially fills the cavity, and providing the mesh with particulate matter that is received within interstitial spaces of the mesh.

Clause 48: The method of Clause 47, wherein providing the cavity with the fibers includes attaching the fibers to one another.

Clause 49: The method of any of the preceding Clauses, wherein providing the cavity with the fibers includes fixing the fibers for movement with the outsole.

Clause 50: The method of any of the preceding Clauses, wherein providing the mesh with the particulate matter includes providing the mesh with foam beads.

Clause 51: The method of Clause 50, wherein providing the mesh with the foam beads includes providing foam beads having a substantially spherical shape.

Clause 52: The method of Clause 50, wherein providing the mesh with the foam beads includes providing foam beads having approximately the same size and shape.

Clause 53: The method of Clause 50, wherein providing the mesh with the foam beads includes providing foam beads having at least one of a different size and shape.

Clause 54: The method of any of the preceding Clauses, wherein forming the mesh includes providing the mesh with a different density along a length of the outsole.

Clause 55: The method of Clause 47, further comprising providing the outsole with a heel region, a forefoot region, and a mid-foot region disposed between the heel region and the forefoot region.

Clause 56: The method of Clause 55, wherein forming the mesh includes providing the mesh with a different density in at least one of the heel region, the forefoot region, and the mid-foot region.

Clause 57: The method of Clause 55, wherein forming the mesh includes providing the mesh with a substantially constant density in each of the heel region, the forefoot region, and the mid-foot region.

Clause 58: The method of Clause 55, wherein forming the mesh includes providing the mesh with a different density in each of the heel region, the forefoot region, and the mid-foot region.

Clause 59: The method of Clause 55, further comprising providing walls to separate the heel region, the forefoot region, and the mid-foot region.

Clause 60: The method of Clause 59, wherein providing the walls includes providing walls that extend substantially perpendicular to a longitudinal axis of the outsole.

Clause 61: The method of Clause 59, wherein providing the walls includes providing walls that extend from the outsole toward a bottom surface of the footbed.

Clause 62: The method of Clause 61, wherein providing the walls includes providing walls that are spaced apart from the bottom surface of the footbed.

Clause 63: The method of Clause 61, wherein providing the walls includes placing at least one of the walls in contact with the bottom surface of the footbed.

Clause 64: The method of Clause 61, wherein providing the walls includes placing each of the walls in contact with the bottom surface of the footbed.

Clause 65: The method of Clause 55, further comprising preventing movement of the particulate matter between the heel region, the forefoot region, and the mid-foot region.

Clause 66: The method of Clause 55, further comprising restricting movement of the particulate matter between the heel region, the forefoot region, and the mid-foot region.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An article of footwear comprising:
   an upper;
   an outsole attached to the upper and including a ground-engaging surface, an inner surface formed on an opposite side of the outsole than the ground-engaging surface, and a wall surrounding a perimeter of the outsole, the wall cooperating with the inner surface to define a cavity;
   a midsole disposed between the upper and the outsole and including a footbed and a bottom surface disposed on an opposite side of the midsole than the footbed and opposing the inner surface of the outsole;
   fibers received within the cavity and cooperating with one another to form a mesh that rests on the outsole and at least partially fills the cavity, the mesh including a different density along a length of the midsole; and
   particulate matter disposed within the cavity and received within interstitial spaces of the mesh, the particulate matter moveable within the interstitial spaces relative to the fibers.

2. The article of footwear of claim 1, wherein the fibers restrict unfettered movement of the particulate matter within the mesh.

3. The article of footwear of claim 1, wherein the fibers are attached to one another.

4. The article of footwear of claim 1, wherein the fibers are moveable relative to one another.

5. The article of footwear of claim 1, wherein the mesh is fixed for movement with the outsole.

6. The article of footwear of claim 1, wherein the particulate matter includes foam beads.

7. The article of footwear of claim 6, wherein the foam beads include a substantially spherical shape.

8. The article of footwear of claim 6, wherein the foam beads include approximately the same size and shape.

9. The article of footwear of claim 6, wherein the foam beads include at least one of a different size and shape.

10. An article of footwear comprising:
    an upper;
    an outsole attached to the upper and including a ground-engaging surface;
    a footbed disposed between the upper and the outsole;
    fibers disposed between the outsole and the footbed and cooperating with one another to form a mesh that is detached from the outsole and the footbed and at least partially fills a cavity between the outsole and the footbed, the mesh including a different density along a length of the outsole; and
    particulate matter disposed within the cavity and received within interstitial spaces of the mesh, the particulate matter moveable within the interstitial spaces relative to the fibers.

11. The article of footwear of claim 10, wherein the fibers restrict unfettered movement of the particulate matter within the mesh.

12. The article of footwear of claim 10, wherein the fibers are attached to one another.

13. The article of footwear of claim 10, wherein the fibers are moveable relative to one another.

14. The article of footwear of claim 10, wherein the particulate matter includes foam beads.

15. The article of footwear of claim 14, wherein the foam beads include a substantially spherical shape.

16. The article of footwear of claim 14, wherein the foam beads include approximately the same size and shape.

17. The article of footwear of claim 14, wherein the foam beads include at least one of a different size and shape.

* * * * *